Sept. 3, 1929.  J. W. HOBBS  1,727,205
WHEEL
Filed April 26, 1928
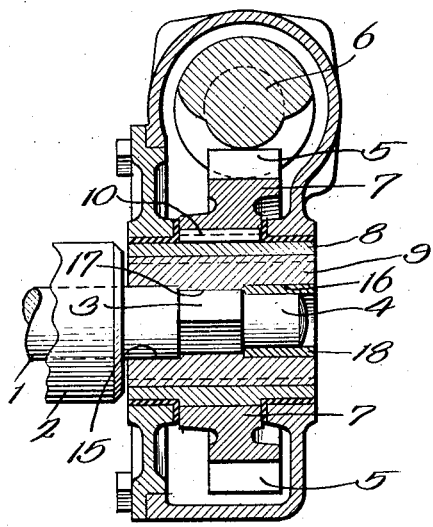
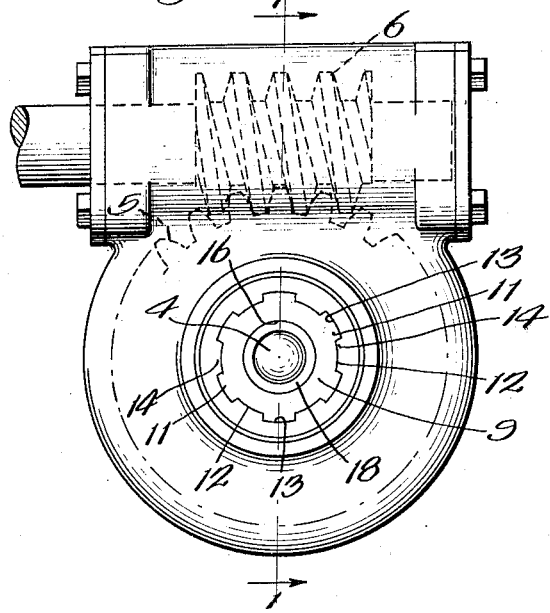
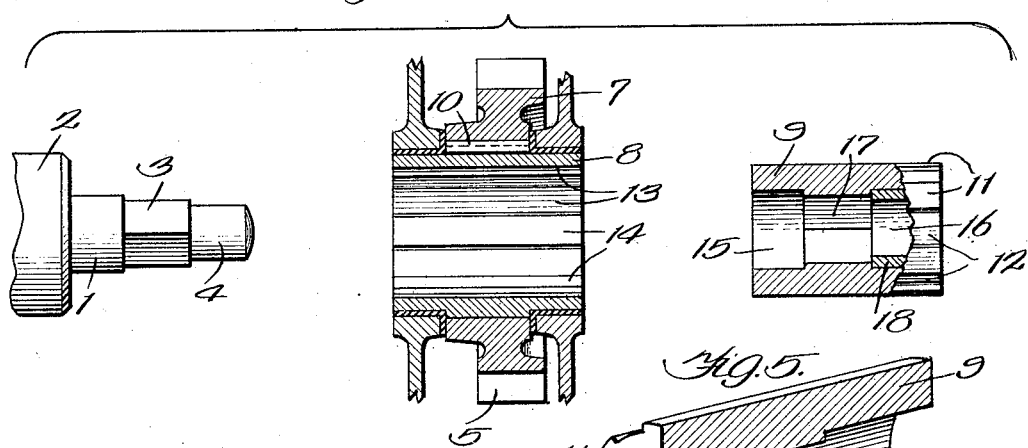
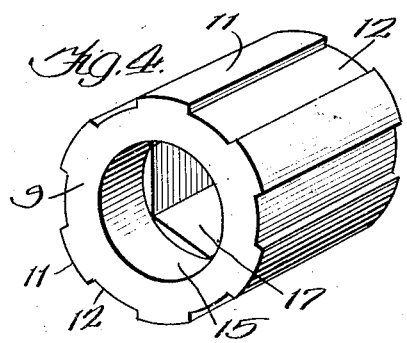
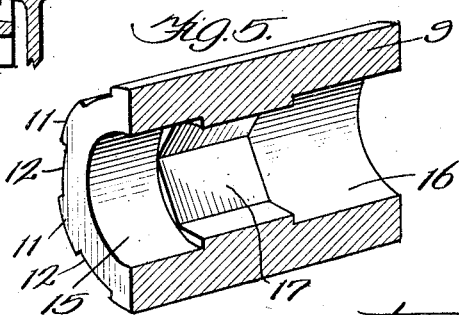
Inventor:
John W. Hobbs
By R. L. Grogg atty.

Patented Sept. 3, 1929.

1,727,205

UNITED STATES PATENT OFFICE.

JOHN W. HOBBS, OF MOLINE, ILLINOIS, ASSIGNOR, BY MESNE ASSIGNMENTS, TO THE DUFF-NORTON MANUFACTURING COMPANY, OF PITTSBURGH, PENNSYLVANIA, A CORPORATION OF PENNSYLVANIA.

WHEEL.

Application filed April 26, 1928. Serial No. 273,101.

My invention relates to wheels whose hubs have bores that are shaped to be slipped upon shafts for the wheels.

One feature of the invention consists in forming the hub of such a wheel in two assembled parts, one surrounding the other, the bore of the hub being formed in the latter part and shaped to accommodate the particular shaft upon which the wheel is to be disposed. The two hub portions are desirably assembled in fixed relation by means of tongue and groove formations which extend along the axis of the hub and enable what may be termed a feather or splined engagement between the hub parts whereby they are assembled in fixed relation.

In accordance with another feature of the invention, the central hub portion which is to be slipped upon the shaft has a peculiar bore formation whereby it may be readily slipped upon and have fixed engagement with the shaft. This bore formation is inclusive of two end portions of cylindrical contour and an intermediate portion of polygonal contour which is circumscribed by the circles of the end portions of the bore. The shaft has a polygonal portion shaped similarly to the polygonal portion of the bore and two cylindrical portions between which this polygonal portion is disposed, one of these cylindrical shaft portions being snugly received within one of the cylindrical bore portions and the other cylindrical shaft portion being sufficiently small to pass through the polygonal bore portion into the remaining cylindrical bore portion, a sleeve or cylindrical liner being employed which snugly fills the cylindrical or annular clearance between the latter shaft portion and the bore portion which receives it. This construction enables the accurate formation of the bore of the wheel and a rigid mounting of the wheel upon the shaft.

My invention, especially the first aforesaid feature thereof, is of particular service when employed in connection with the final wheels of power increasing gearing that is applied to the shafts of hand operated jacks to convert such jacks to power driven jacks. The portions of such jack shafts to which power is initially applied vary in shape with different makes and capacities of hand operated jacks. By making the hubs of the final gear wheels of power increasing gearing in two assembled parts as described, such wheels may be of uniform size throughout except in the central hub portions thereof which are shaped to suit the different jack shafts to which power increasing gearing is to be applied. By means of this feature of my invention, the power increasing gearing may be uniformly made except for the central hub portions of the final wheels thereof which are selected to suit the particular jack shafts that are to be assembled with the gearing.

The invention will be more fully explained in connection with the accompanying drawing in which Fig. 1 illustrates, in elevation, a portion of a shaft, such as the operating shaft of a hand operated lifting jack, and a portion of a bearing for this shaft, a portion of the power increasing gearing applied to this shaft and inclusive of a final wheel made in accordance with the preferred embodiment of my invention being illustrated in a section that is taken on line 1—1 of Fig. 2; Fig. 2 is a side view of the structure shown in Fig. 1; Fig. 3 shows parts of the structure appearing in Figs. 1 and 2 in separated relation, portions being shown in section and other portions in elevation; Fig. 4 is a perspective view of the preferred form of central hub portion; and Fig. 5 is a perspective view of a half of the part shown in Fig. 4 to illustrate more clearly the formation of the hub bore.

The shaft illustrated has a cylindrical bearing portion 1 which turns within a suitable bearing 2. The shaft has another portion 3 immediately adjacent the cylindrical portion 1 and of hexagonal or other polygonal contour, the portion 3 being within or circumscribed by the circle of the portion 1. Said shaft has another cylindrical portion 4 at its outer end, this latter portion being within or circumscribed by the polygonal figure of the shaft portion 3.

The power increasing gearing illustrated includes a worm wheel whose teeth 5 are in mesh with a worm 6, which worm may be suitably driven as by means of a motor or, if preferred, by hand whereby the shaft 1 is driven with increased power although at slower speed. In the embodiment of the invention illustrated, the worm wheel is formed in three parts, namely, the external body portion 7 with which the teeth 5 are integrally formed, and the hub having the two parts 8 and 9, the latter surrounded by the former and the former fixed in relation to the gear body 7 by means of the key 10. In the preferred embodiment of the invention, the exterior or surrounding hub portion 8 is fixedly and permanently secured to and within the worm wheel body 7 while the internal hub portion 9 is not assembled with and within the hub portion 8 until the particular shaft to which the wheel is to be applied has been selected. When such shaft has been selected, a hub portion 9 whose bore conforms to the shape of the shaft is assembled with the hub portion 8 of the worm wheel.

In the preferred embodiment of the invention, the hub portions 8 and 9 are brought into fixed assembly by means of the tongues or tenons 11 and the mortises or grooves 12 upon the inner hub portion 9 and corresponding mortises or grooves 13 upon the interior of the hub portion 8 that receive the tongues or tenons 11 and corresponding tongues or tenons 14 also upon the interior of the hub portion 8 that enter the mortises or grooves 12. These mortises and tenons or tongues and grooves extend along the axis of the wheel so that the hub portion 9 may be inserted within the hub portion 8 by movement along the axis of the wheel when the respective tongues and grooves have been brought into register.

The bore of the central hub portion 9 is formed, at one end, with a cylindrical division 15, at its other end with another cylindrical division 16, and with a division 17 which is between the divisions 15 and 16 and is polygonal in contour. The bore division 15 snugly receives the adjacent portion of the cylindrical shaft part 1. The bore division 17 snugly receives the polygonal portion 3 of the shaft. The cylindrical bore division 16 is similar in diameter to the bore division 15, the circles of these two bore divisions circumscribing the bore division 17. The cylindrical shaft portion 4 is sufficiently small to be passed through the bore division 17 but is preferably sufficiently large in diameter as to have snug sliding engagement with the innermost portions of the bore portion 17. When the shaft is initially fully received within the hub portion 9, a cylindrical or annular clearance intervenes between the shaft portion 4 and the surrounding surface of the bore portion 16. I snugly fill this clearance by a sleeve or cylindrical liner 18, this liner constituting, in effect, an applied portion of the hub part 9 which is thus brought into engagement with the shaft portion 4. By this construction the wheel is adapted to be rigidly secured upon the shaft in a manner to keep its plane perpendicular to the axis of the shaft, the shaft part 3 establishing fixed relation with the middle portion of the wheel and the shaft portions 1 and 4 cooperating to resist any tendency to the departure of the wheel from its perpendicular relation to the shaft.

Changes may be made without departing from the invention.

Having thus described my invention, I claim:

1. A wheel whose hub has a bore formed with an intermediate division of polygonal contour and cylindrical divisions between which the intermediate division is disposed and whose circles circumscribe the polygonal division of the bore, in combination with a shaft having a polygonal portion snugly received within the intermediate bore portion, said shaft also having one cylindrical portion which is snugly received within one of the cylindrical divisions of the aforesaid bore and a cylindrical end portion which is passed through the polygonal bore portion into the remaining cylindrical bore portion; and a cylindrical liner snugly received within the space between the latter shaft portion and the surrounding portion of the wheel hub.

2. A wheel having a hub formed in two separable portions, one surrounding the other, the inner of said portions having a bore formed with an intermediate division of polygonal contour and cylindrical divisions between which the intermediate division is disposed and whose circles circumscribe the polygonal division of the bore, in combination with a shaft having a polygonal portion snugly received within the intermediate bore portion, said shaft also having one cylindrical portion which is snugly received within one of the cylindrical divisions of the aforesaid bore and a cylindrical end portion which is passed through the polygonal bore portion into the remaining cylindrical bore portion, and a cylindrical liner snugly received within the space between the latter shaft portion and the surrounding portion of the wheel hub.

In witness whereof, I hereunto subscribe my name.

JOHN W. HOBBS.